(12) United States Patent
Cholst et al.

(10) Patent No.: US 12,377,478 B2
(45) Date of Patent: Aug. 5, 2025

(54) RECIPROCATING SAW

(71) Applicant: MILWAUKEE ELECTRIC TOOL CORPORATION, Brookfield, WI (US)

(72) Inventors: Beth E. Cholst, Wauwatosa, WI (US); Troy C. Thorson, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 237 days.

(21) Appl. No.: 16/744,431

(22) Filed: Jan. 16, 2020

(65) Prior Publication Data
US 2020/0222996 A1   Jul. 16, 2020

Related U.S. Application Data

(60) Provisional application No. 62/793,184, filed on Jan. 16, 2019.

(51) Int. Cl.
*B23D 51/16*   (2006.01)
*B23D 49/16*   (2006.01)
*B23D 51/10*   (2006.01)

(52) U.S. Cl.
CPC .......... *B23D 51/16* (2013.01); *B23D 49/162* (2013.01); *B23D 51/10* (2013.01)

(58) Field of Classification Search
CPC ........ B23D 49/08; B23D 49/10; B23D 49/16; B23D 49/162; B23D 51/10; B23D 51/16;
(Continued)

(56) References Cited

U.S. PATENT DOCUMENTS 2,639,737 A * 5/1953 Forsberg ............... B23D 51/02
  30/392
3,729,823 A * 5/1973 Bos ........................ B23D 51/16
  30/394

(Continued)

FOREIGN PATENT DOCUMENTS

CN   2504022 Y   8/2002
CN   103100759 A   5/2013
(Continued)

OTHER PUBLICATIONS

International Search Report and Written Opinion for Application No. PCT/US2020/013792 dated May 18, 2020 (8 pages).
(Continued)

*Primary Examiner* — Adam J Eiseman
*Assistant Examiner* — Samuel A Davies
(74) *Attorney, Agent, or Firm* — Michael Best & Friedrich LLP

(57) ABSTRACT

A reciprocating saw including a motor defining a motor axis, the motor including a front end and a back end, the front end including a front face defining a first vertical plane, and the back end including a rear face defining a second vertical plane parallel to the first vertical plane. The reciprocating saw also includes a dual-eccentric scotch yoke mechanism coupled to the motor. The scotch yoke mechanism includes a spindle driven to reciprocate relative to the motor along a spindle axis parallel to the motor axis, the spindle including a rear end nearest to the motor. The scotch yoke mechanism also includes a counterweight driven to reciprocate relative to the motor. The spindle is arranged above the motor. As the spindle reciprocates forward and backward, the rear end extends into a space defined between the first and second vertical planes.

9 Claims, 9 Drawing Sheets

(58) Field of Classification Search
CPC . B23D 49/12; B23D 49/165; Y10T 74/18264; A22B 5/207; B25D 2217/0073; B25D 2217/0088
USPC .................................. 74/22 A; 30/392, 394
See application file for complete search history.

(56) References Cited

U.S. PATENT DOCUMENTS

| | | | |
|---|---|---|---|
| 3,750,483 A | 8/1973 | Burrows et al. | |
| 3,943,782 A * | 3/1976 | Gloviak | B25D 11/12 74/50 |
| 4,145,811 A * | 3/1979 | Kendzior | A22B 5/207 30/394 |
| 4,206,657 A | 6/1980 | Palm | |
| 4,240,204 A * | 12/1980 | Walton, II | B23D 49/167 83/776 |
| 4,272,996 A * | 6/1981 | Sauerwein | B23D 49/162 74/50 |
| 4,276,941 A * | 7/1981 | Wanner | B25D 11/125 173/117 |
| 4,425,880 A * | 1/1984 | Rochlus | F01B 9/023 123/44 C |
| 4,512,291 A * | 4/1985 | Kirk | F02B 75/222 123/54.2 |
| 4,884,344 A | 12/1989 | Martinez et al. | |
| 4,976,164 A | 12/1990 | Lentino | |
| 5,079,844 A | 1/1992 | Palm | |
| 5,392,519 A | 2/1995 | Inoue et al. | |
| 6,226,877 B1 * | 5/2001 | Ono | B23D 49/162 30/392 |
| RE37,211 E * | 6/2001 | Bednar | B23D 49/162 464/36 |
| 6,357,125 B1 | 3/2002 | Feldmann et al. | |
| 6,568,089 B1 * | 5/2003 | Popik | B23D 49/162 30/392 |
| 7,064,462 B2 | 6/2006 | Hempe et al. | |
| 7,191,847 B2 | 3/2007 | Haas | |
| 7,363,713 B2 | 4/2008 | Hirabayashi et al. | |
| 7,424,779 B2 | 9/2008 | Tozawa et al. | |
| 7,526,868 B2 | 5/2009 | Oki et al. | |
| 7,743,514 B2 | 6/2010 | Oki et al. | |
| 7,996,996 B2 | 8/2011 | Hirabayashi | |
| 8,141,257 B2 | 3/2012 | Haas | |
| 8,371,032 B2 | 2/2013 | Hirabayashi | |
| 9,073,563 B2 * | 7/2015 | Middleton | B25F 5/02 |
| 9,573,207 B2 * | 2/2017 | Sugita | B23D 51/16 |
| 9,724,771 B2 | 8/2017 | Aoki et al. | |
| 2002/0170186 A1 | 11/2002 | Sakaguchi | |
| 2003/0163924 A1 * | 9/2003 | Hempe | B23D 47/12 30/388 |
| 2004/0222001 A1 * | 11/2004 | Ikuta | B25D 17/24 173/210 |
| 2004/0255475 A1 * | 12/2004 | Hirabayashi | B23D 51/16 30/392 |
| 2004/0261273 A1 * | 12/2004 | Griep | B23D 61/06 30/392 |
| 2005/0022395 A1 * | 2/2005 | Hirabayashi | B23D 51/16 30/392 |
| 2006/0117580 A1 * | 6/2006 | Serdynski | B23D 51/16 30/392 |
| 2007/0017684 A1 * | 1/2007 | Stirm | B25D 17/24 173/210 |
| 2011/0226500 A1 * | 9/2011 | Furusawa | B25D 17/24 173/110 |
| 2013/0019483 A1 * | 1/2013 | Naughton | B23D 51/16 30/376 |
| 2013/0207491 A1 * | 8/2013 | Hatfield | H02K 11/30 310/50 |
| 2014/0182428 A1 * | 7/2014 | Moreno | B25F 5/006 83/13 |
| 2014/0190023 A1 * | 7/2014 | Vitantonio | B23D 51/16 83/838 |
| 2015/0033564 A1 * | 2/2015 | Kobori | B25F 5/006 30/392 |
| 2016/0303668 A1 * | 10/2016 | Sugino | B23D 49/162 |
| 2017/0157689 A1 * | 6/2017 | Doumani | B25F 5/006 |
| 2018/0119626 A1 * | 5/2018 | Wightman | H02K 11/215 |
| 2018/0370012 A1 * | 12/2018 | Zheng | F16F 15/22 |

FOREIGN PATENT DOCUMENTS

| | | |
|---|---|---|
| CN | 103372683 A | 10/2013 |
| DE | 4235278 A1 | 4/1994 |
| JP | 2004042211 A | 2/2004 |
| JP | 2018089809 A | 6/2018 |
| SE | 7204870 L | 11/1972 |

OTHER PUBLICATIONS

Partial Supplementary European Search Report for Application No. 20741520.9 dated Oct. 7, 2022 (15 pages).

* cited by examiner

RECIPROCATING SAW

CROSS-REFERENCE TO RELATED APPLICATIONS

This application claims priority to U.S. Provisional Patent Application No. 62/793,184 filed on Jan. 16, 2019, the entire content of which is incorporated herein by reference.

FIELD OF THE INVENTION

The present invention relates to power tools, and more particularly reciprocating saws.

BACKGROUND OF THE INVENTION

Power tools include different types of drive mechanisms to perform work. Power tools with reciprocating-type drive mechanisms commonly include counterweights to counterbalance forces generated by output elements (e.g., saw blades) during reciprocating movement.

SUMMARY OF THE INVENTION

The present invention provides, in one aspect, a reciprocating saw including a motor defining a motor axis, the motor including a front end and a back end, the front end including a front face defining a first vertical plane, and the back end including a rear face opposite the front face, the rear face defining a second vertical plane parallel to the first vertical plane. The reciprocating saw also includes a dual-eccentric scotch yoke mechanism coupled to the motor. The scotch yoke mechanism includes a spindle driven to reciprocate relative to the motor along a spindle axis parallel to the motor axis, the spindle including a rear end nearest to the motor. The scotch yoke mechanism also includes a counterweight driven to reciprocate relative to the motor and opposite to the spindle. The spindle is arranged above the motor such that, as the spindle reciprocates forward and backward for each drive cycle, the rear end extends into a space defined between the first and second vertical planes during at least a portion of the drive cycle.

The present invention provides, in another aspect, a reciprocating saw including a motor, a lower gear case subassembly, and an upper gear case subassembly. The lower gear case subassembly includes a first driveshaft portion, and a counterweight configured to be driven by the motor to reciprocate via the first driveshaft portion. The upper gear case subassembly includes a second driveshaft portion, and a spindle configured to be driven by the motor to reciprocate via the second driveshaft portion. The first driveshaft portion is coupled to the second driveshaft portion by joining the upper and lower gear case subassemblies.

The present invention provides, in another aspect, a reciprocating saw including a motor defining a motor axis, a lower gear case subassembly, and an upper gear case subassembly. The motor includes a front end and a back end, the front end including a front face defining a first vertical plane, and the back end including a rear face opposite the front face, the rear face defining a second vertical plane parallel to the first vertical plane. The lower gear case subassembly includes a first driveshaft portion, and a counterweight configured to be driven by the motor to reciprocate via the first driveshaft portion. The second gear case subassembly includes a second driveshaft portion, and a spindle configured to be driven by the motor to reciprocate relative to the motor via the second driveshaft portion. The spindle is configured to reciprocate along a spindle axis parallel to the motor axis, and the spindle includes a rear end nearest to the motor. The first driveshaft portion is coupled to the second driveshaft portion by joining the upper and lower gear case subassemblies. The spindle is arranged above the motor such that, as the spindle reciprocates forward and backward for each drive cycle, the rear end extends into a space defined between the first and second vertical planes during at least a portion of the drive cycle.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-13 illustrate a power tool 10 according to an embodiment of the invention. The illustrated power tool 10 is a reciprocating saw 10 that is operable to drive a saw blade 12 in a reciprocating cutting motion. In the illustrated embodiment, the saw blade 12 reciprocates along a linear axis. In other embodiments (not shown), the reciprocating saw 10 can be operable to drive the saw blade 12 in an orbital or rocking cutting motion. The reciprocating saw 10 reciprocates the saw blade 12 through a fixed stroke length (e.g., ¾", 1⅛", etc.). As will be discussed in further detail below, the reciprocating saw 10 is configured with a particular arrangement of components that provides for a shortened overall tool length.

Figure 1:
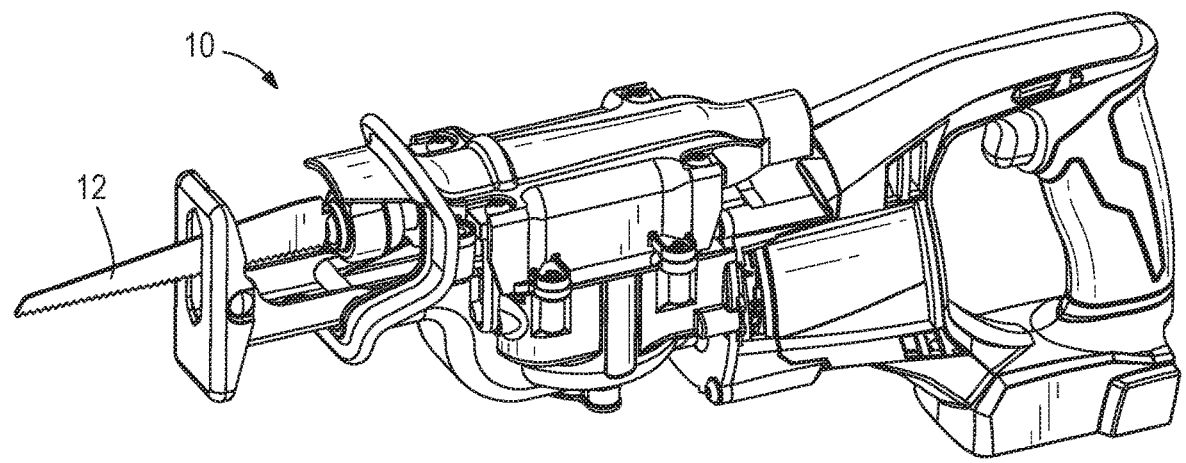
FIG. 1 is a perspective view of a reciprocating saw.
Figure 2:
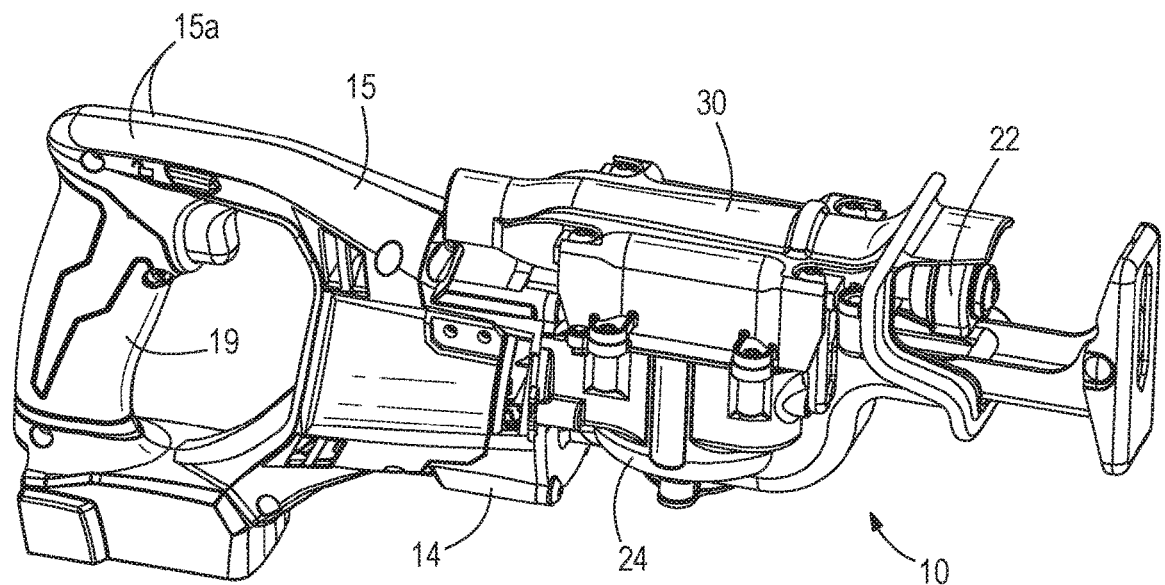
FIG. 2 is another perspective view of the reciprocating saw of FIG. 1.

With reference to FIG. 2, the reciprocating saw 10 includes a motor housing 14, an electric motor 16 (FIG. 13) positioned substantially within the motor housing 14, and a handle housing 15 (e.g., formed from two clamshell housing halves 15a) attached to the motor housing 14 and defining a handle 19. In the illustrated embodiment, the motor 16 receives power from an on-board power source (e.g., a battery pack, not shown). The battery pack may include any of a number of different nominal voltages (e.g., 12V, 18V, etc.), and may be configured having any of a number of different chemistries (e.g., lithium-ion, nickel-cadmium, etc.). Alternatively, the motor 16 may be powered by a remote power source (e.g., a household electrical outlet) through a power cord. The motor 16 includes an output or motor shaft 17 (FIG. 13) drivably coupled to a drive assembly 18 (FIG. 5), which is further coupled to a spindle 20. A blade clamp 22 (FIG. 2) affixed to a forward end of the spindle 20 secures the saw blade 12 to the spindle 20.

Figure 3:
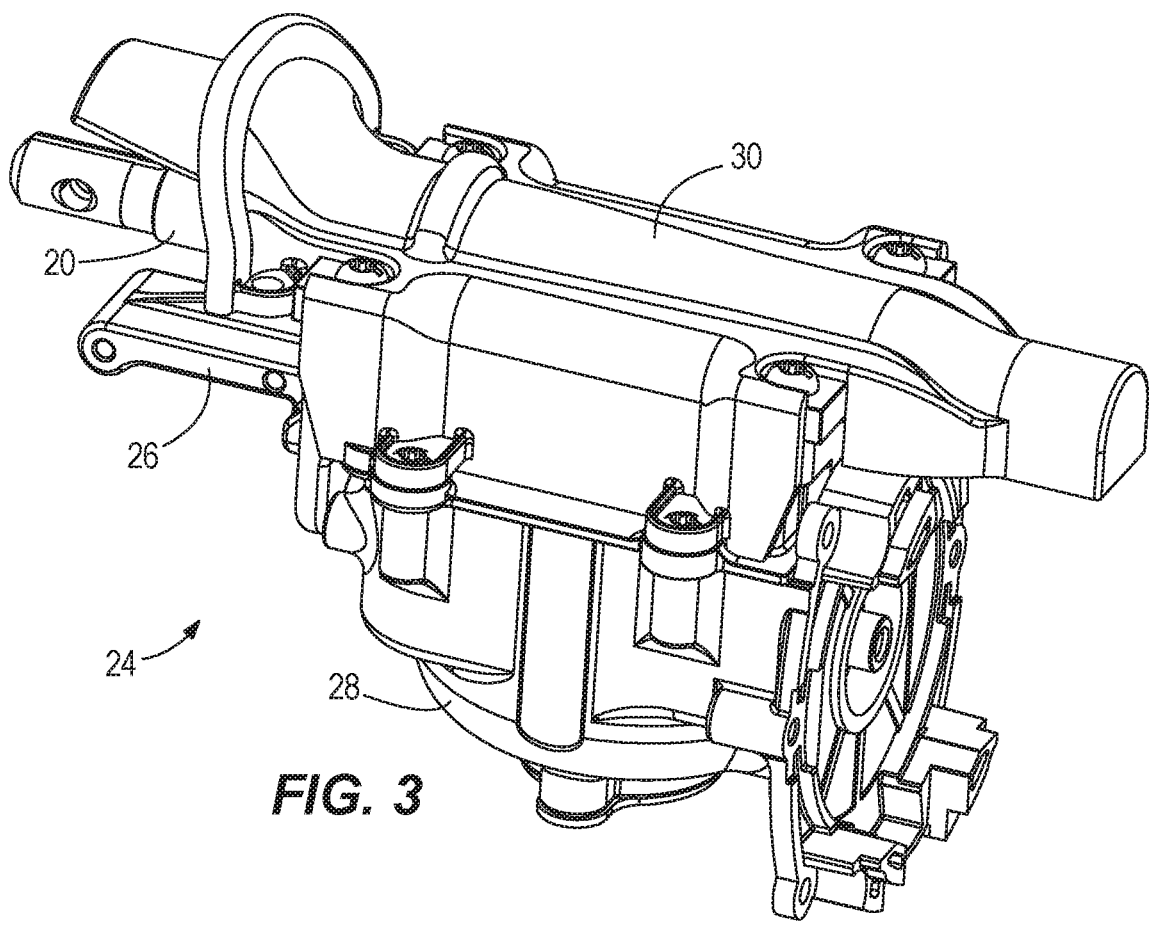
FIG. 3 is a perspective view of a gear case of the reciprocating saw of FIG. 1.
Figure 4:
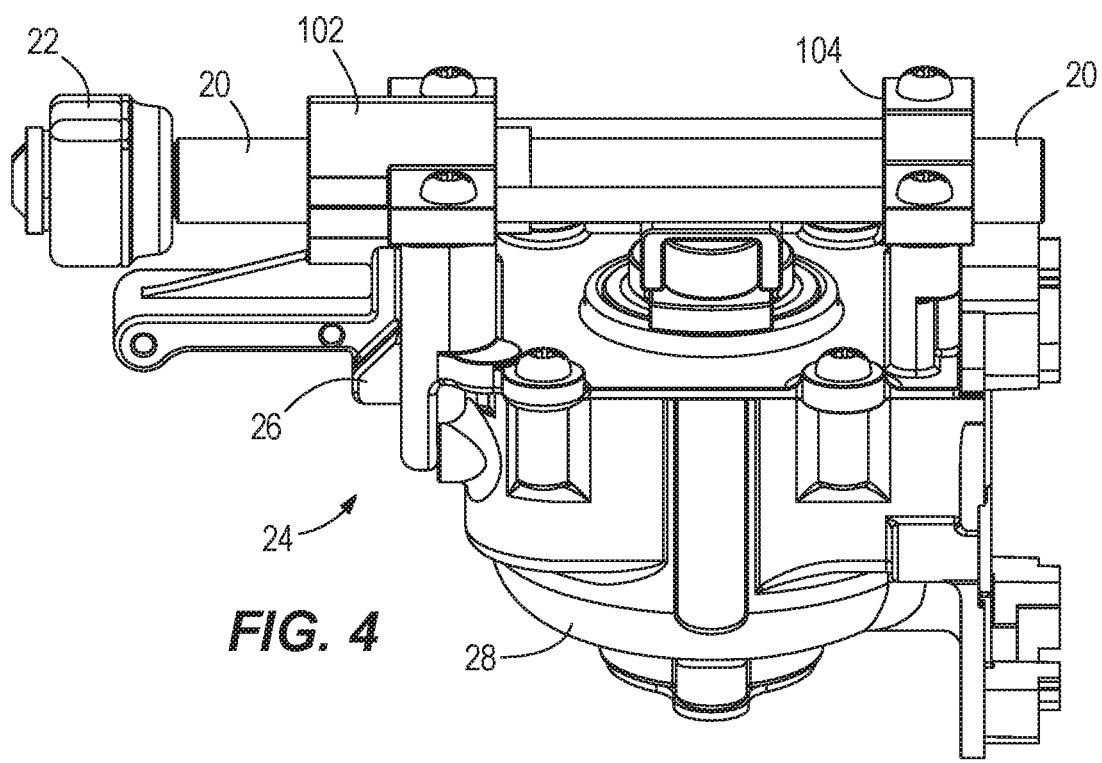
FIG. 4 is another perspective view of the gear case of FIG. 3 with portions removed.

With reference to FIGS. 3 and 4, the reciprocating saw 10 includes a gear case 24 that includes an upper gear case 26 and a lower gear case 28. A spindle cover 30 is secured to the gear case 24 (e.g., via threaded fasteners) to shield the spindle 20 from dust and debris.

Figure 5:
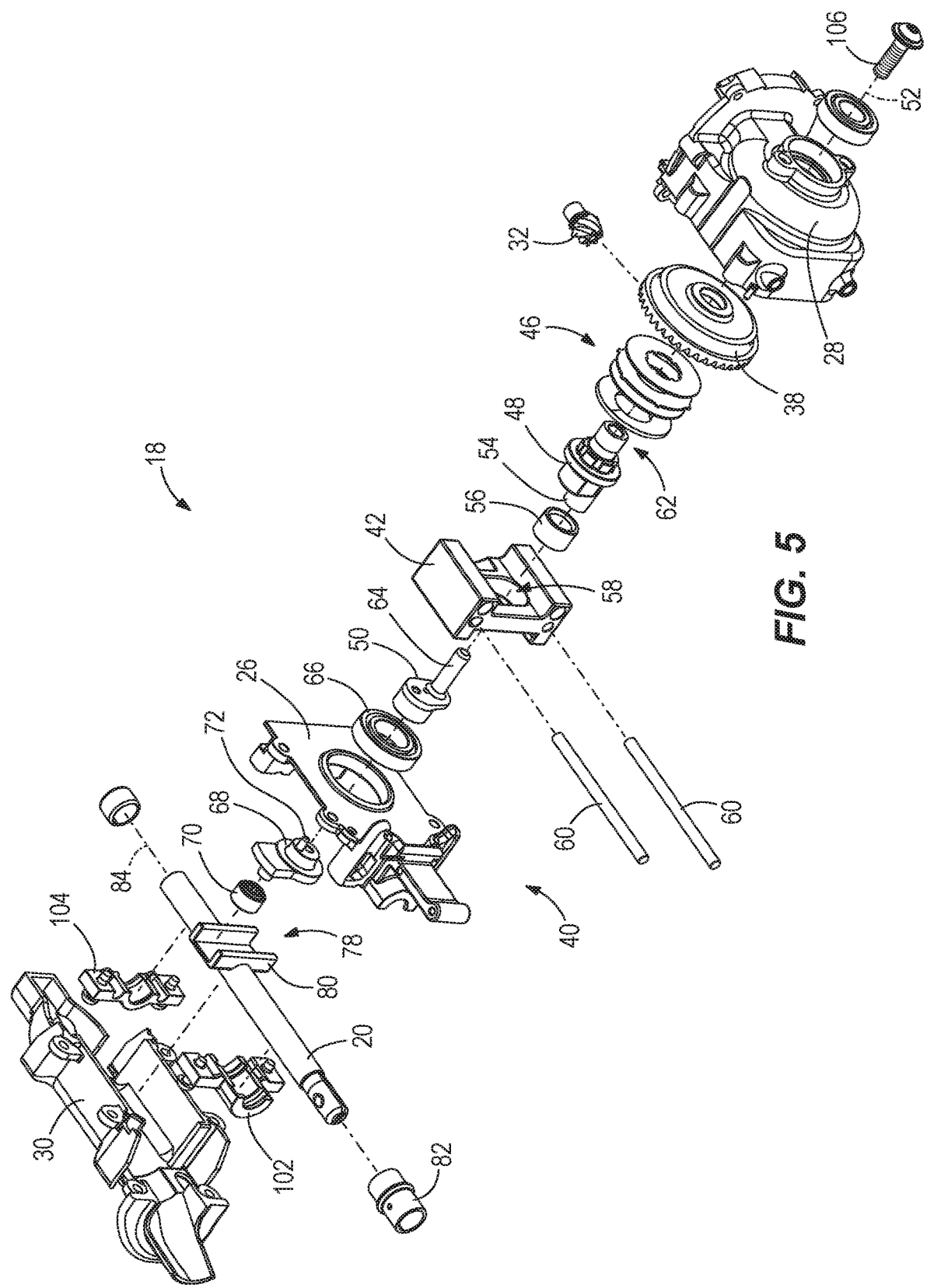
FIG. 5 is an exploded perspective view of the gear case of FIG. 3.
Figure 6:
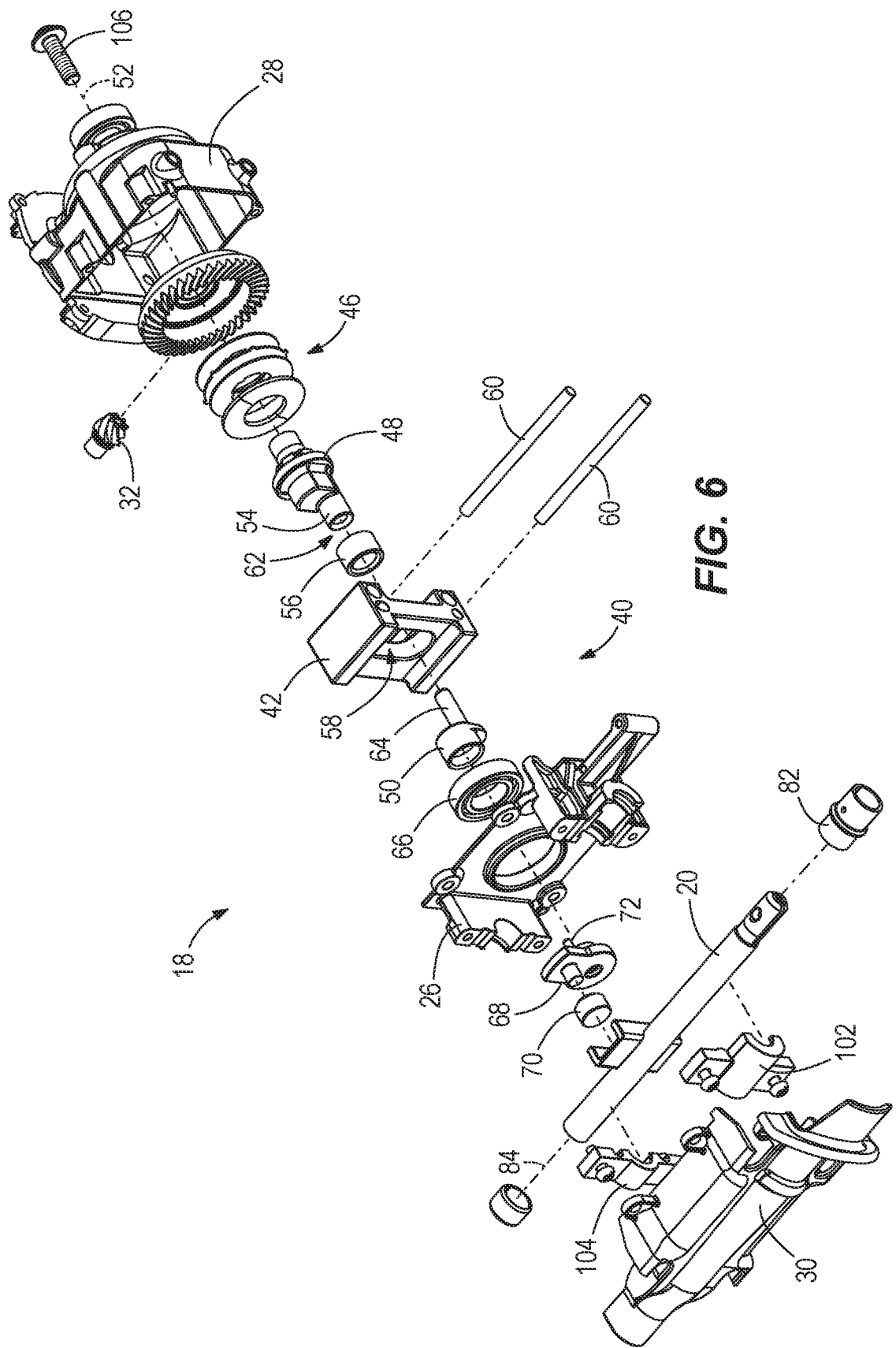
FIG. 6 is another exploded perspective view of the gear case of FIG. 3.

With reference to FIGS. 5 and 6, the drive assembly 18 also includes a gear 38 coupled to the motor shaft 17 (FIG. 13) via an output gear or pinion 32, a dual-eccentric scotch yoke mechanism 40 for driving the spindle 20 in a reciprocating motion, and a clutch assembly 46 (FIG. 8) that selectively transmits torque from the gear 38 to the scotch yoke mechanism 40. The pinion 32 is coupled to the motor shaft 17 and rotates about a motor axis 36 (FIG. 13) defined by the motor 16. The pinion 32 extends into the gear case 24 and engages the gear 38 to transmit rotation from the motor 16 to the gear 38.

Figure 7:
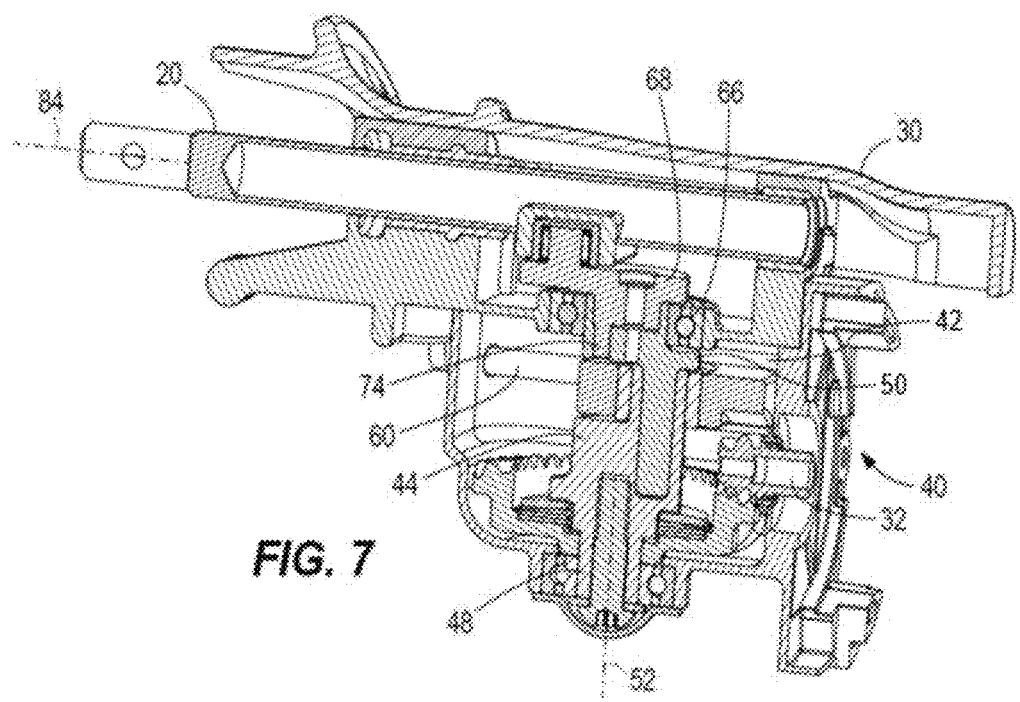
FIG. 7 is a perspective cross-sectional view of the gear case of FIG. 3, illustrating a lower gear case subassembly and an upper gear case subassembly.

The dual-eccentric scotch yoke mechanism 40 includes the spindle 20, a counterweight 42, and a driveshaft 44 (FIG. 7). The driveshaft 44 receives torque from the clutch assembly 46 (FIG. 8), and drives each of the spindle 20 and the counterweight 42 to reciprocate. Specifically, the driveshaft 44 includes a first driveshaft portion 47 (FIG. 11) that drives the counterweight 42, and a second driveshaft portion 49 (FIG. 11) that drives the spindle 20. The first driveshaft portion 47 includes a first driveshaft segment 48. The second driveshaft portion 49 includes a second driveshaft segment 50, and a crankshaft 68 (FIG. 7) coupled to the second driveshaft segment 50. The first driveshaft segment 48 is coupled to the second driveshaft segment 50 and unitized for co-rotation therewith about a driveshaft axis 52. The first driveshaft segment 48 receives torque from the clutch assembly 46, and is formed with an eccentric hub 54 radially offset from the driveshaft axis 52. The eccentric hub 54 carries a counterweight bushing 56 (FIG. 11) that engages an elongated slot 58 formed in the counterweight 42. The counterweight 42 is configured as a rectangular plate slidable along respective guide rails 60 which, in turn, are fixed to the lower gear case 28 (e.g., by press fit). As the driveshaft 44 rotates about the driveshaft axis 52, the counterweight bushing 56 engages the slot 58 to drive the counterweight 42 to reciprocate forward and backward along the guide rails 60 and within the gear case 24.

The second driveshaft segment 50 (FIGS. 5 and 6) is driven by the first driveshaft segment 48 to rotate about the driveshaft axis 52. Specifically, the first driveshaft segment 48 includes a bore 62 (FIG. 11) formed in the eccentric hub 54, and the second driveshaft segment 50 includes a pin 64 that is received in the bore 62 (e.g., by a nominal slip fit) to couple the first driveshaft segment 48 to the second driveshaft segment 50. The second driveshaft segment 50 is further supported for rotation within the gear case 24 by a driveshaft bearing 66 supported by the upper gear case 26 (e.g., by press fit).

Figure 11:
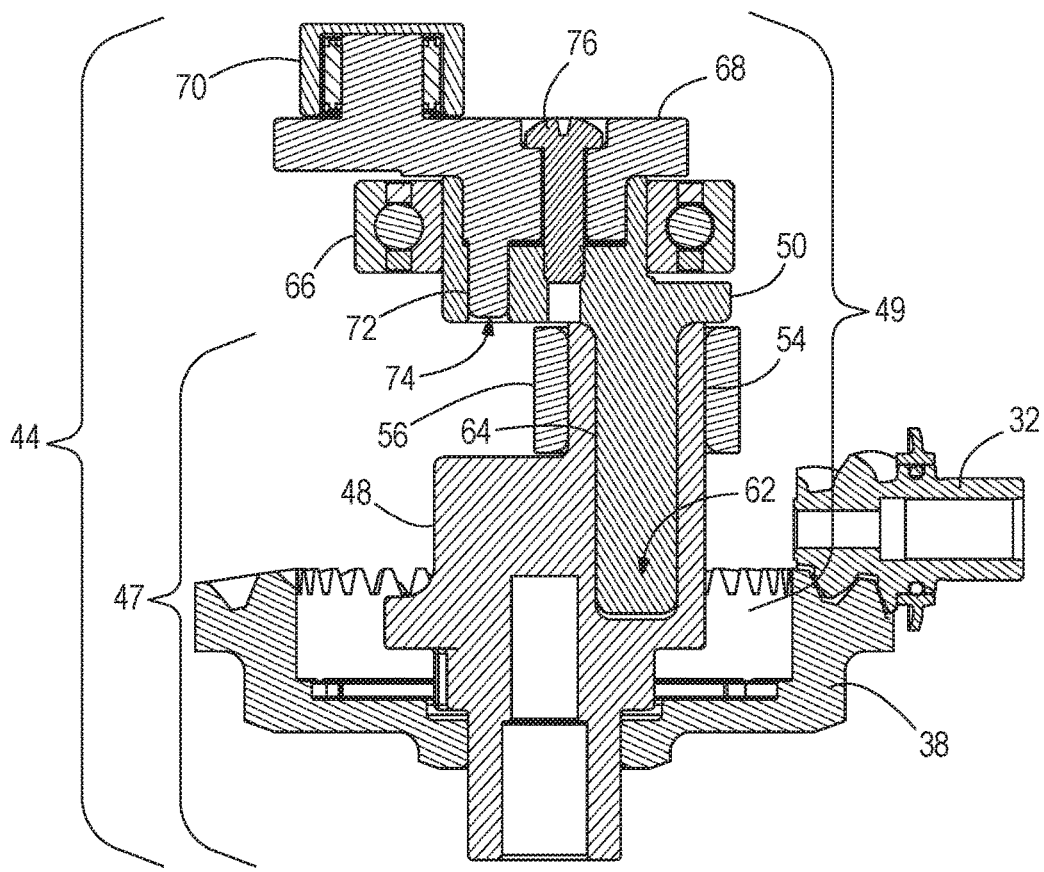
FIG. 11 is a cross-sectional view of portions of a drive assembly of the reciprocating saw of FIG. 1.
Figure 12:
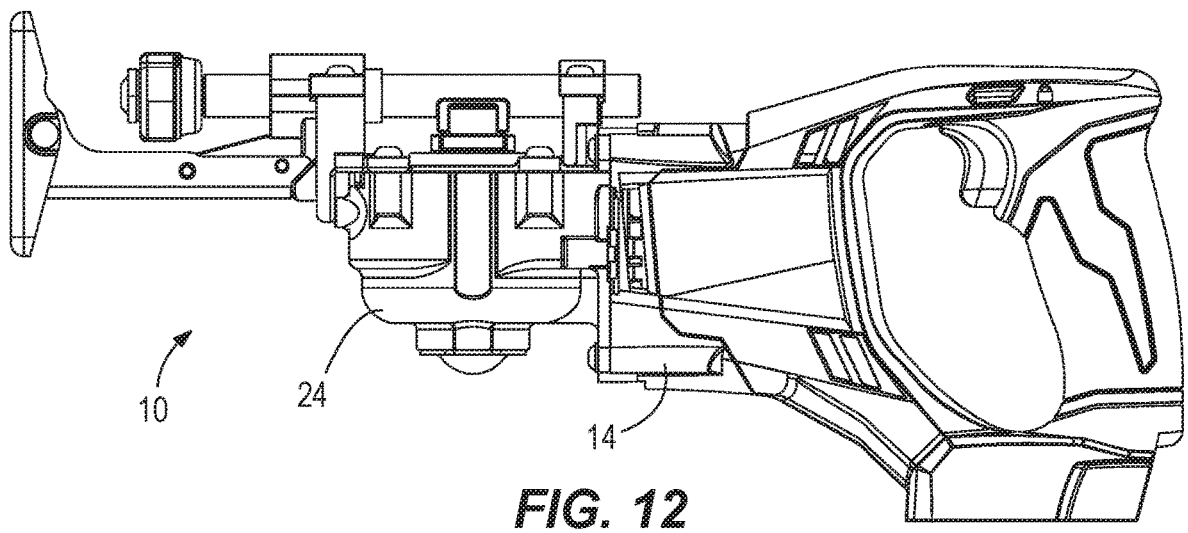
FIG. 12 is a plan view of the reciprocating saw of FIG. 1 with portions removed.

With continued reference to FIG. 11, the second driveshaft segment 50 is further coupled to the crankshaft 68 that supports a spindle bearing 70. The crankshaft 68 is fixed to the second driveshaft segment 50 by press fit, and a locator pin 72 further extends from the crankshaft 68 to engage a locator aperture 74 in the second driveshaft segment 50, thereby ensuring a proper rotational orientation between the crankshaft 68 and the second driveshaft segment 50. A fastener, such as a screw 76, further clamps the crankshaft 68 to the second driveshaft segment 50.

With reference to FIG. 5, the spindle bearing 70 resides within a channel 78 defined by a U-shaped bracket 80 coupled to the spindle 20. The spindle 20 is slidably supported by spindle bushings 82 for reciprocation along a spindle axis 84 (FIG. 7), which is generally parallel to the motor axis 36. As the crankshaft 68 rotates about the driveshaft axis 52, the spindle bearing 70 rotates eccentrically about the driveshaft axis 52, and engages the bracket 80 to drive the spindle 20 to reciprocate forward and backward along the spindle axis 84. The counterweight bushing 56 and the spindle bearing 70 are oriented 180 degrees opposite one another as shown in FIG. 11. Accordingly, the counterweight 42 and the spindle 20 reciprocate in opposite directions in response to rotation of the scotch yoke mechanism 40 (i.e., the counterweight 42 reciprocates forwardly and the spindle 20 rearwardly, and the counterweight 42 reciprocates rearwardly as the spindle 20 reciprocates forwardly). Consequently, vibration generated by the spindle 20, the blade clamp 22, and the saw blade 12 is attenuated.

Figure 13:
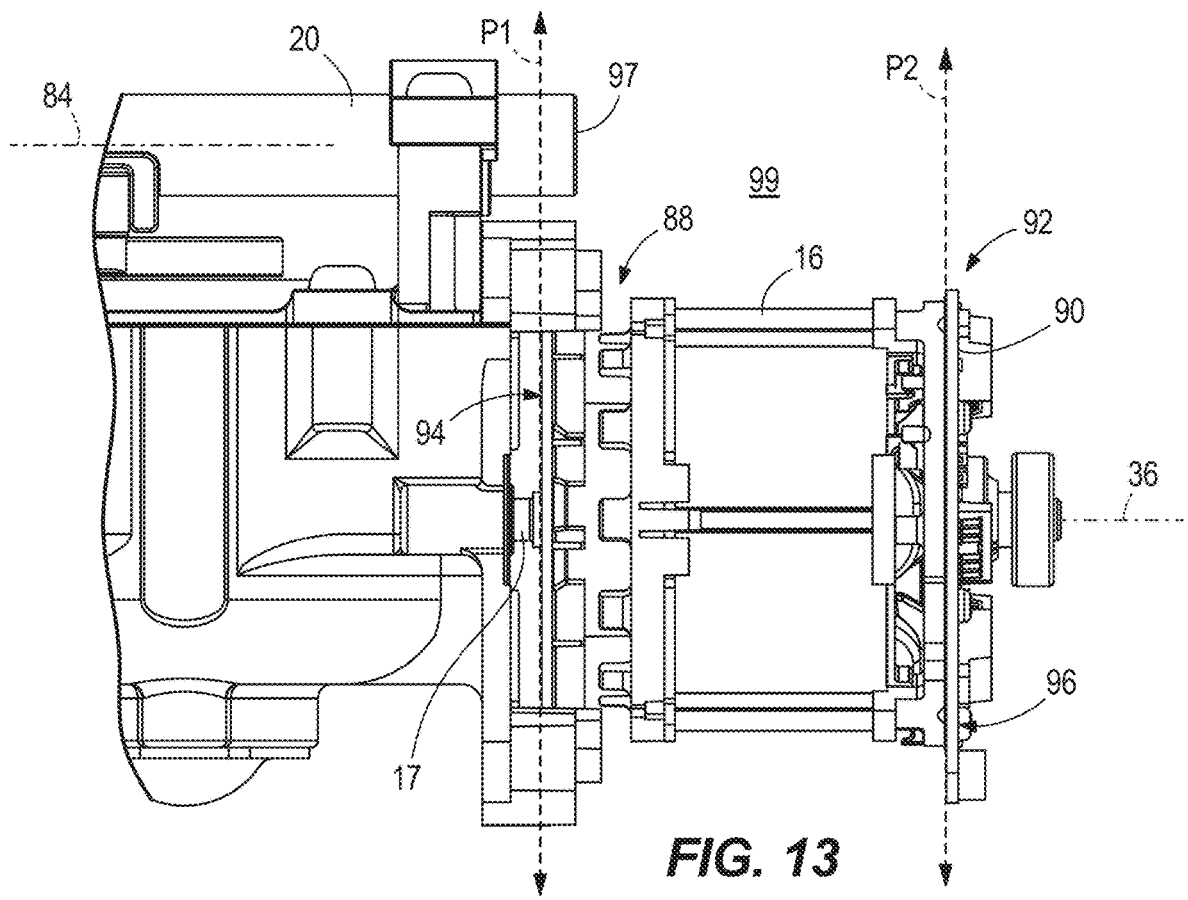
FIG. 13 is a plan view of the reciprocating saw of FIG. 12, with other portions removed.

By incorporating the dual-eccentric scotch yoke mechanism 40 in the reciprocating saw 10, the overall size of the reciprocating saw 10 is reduced as compared to a typical prior-art reciprocating saw. Specifically, the spindle 20 can be arranged above the motor 16, so that the spindle 20 is permitted to drive over the motor 16 as the spindle 20 reciprocates forward and backward. With reference to FIG. 13, the motor 16 includes a fan 86 located at a front end 88 of the motor 16, and a printed circuit board assembly (PCBA) 90 located at a rear end 92 of the motor 16. A front face 94 of the fan 86 defines a first vertical plane P1. Similarly, a rear face 96 of the PCBA 90 defines a second vertical plane P2 that is parallel with the first vertical plane P1. As shown in FIG. 13, the spindle axis 84 is parallel to the motor axis 36, and a rear end 97 of the spindle 20 crosses the vertical plane P2 from the front end 88 toward the rear end 92. More specifically, a space 99 is defined between the first and second vertical planes P1 and P2. As the spindle 20 reciprocates forward and backward along the spindle axis 84 for each drive cycle, the rear end 97 drives over the motor 16 and extends into the space 99 during at least a portion of the drive cycle. Thus, the path traveled by the reciprocating spindle 20 is not constrained by the location of the motor 16, and the spindle 20 and motor 16 can be more closely packaged. This reduces the overall length of the saw 10, yielding a more compact saw 10 compared to the prior art.

Figure 8:
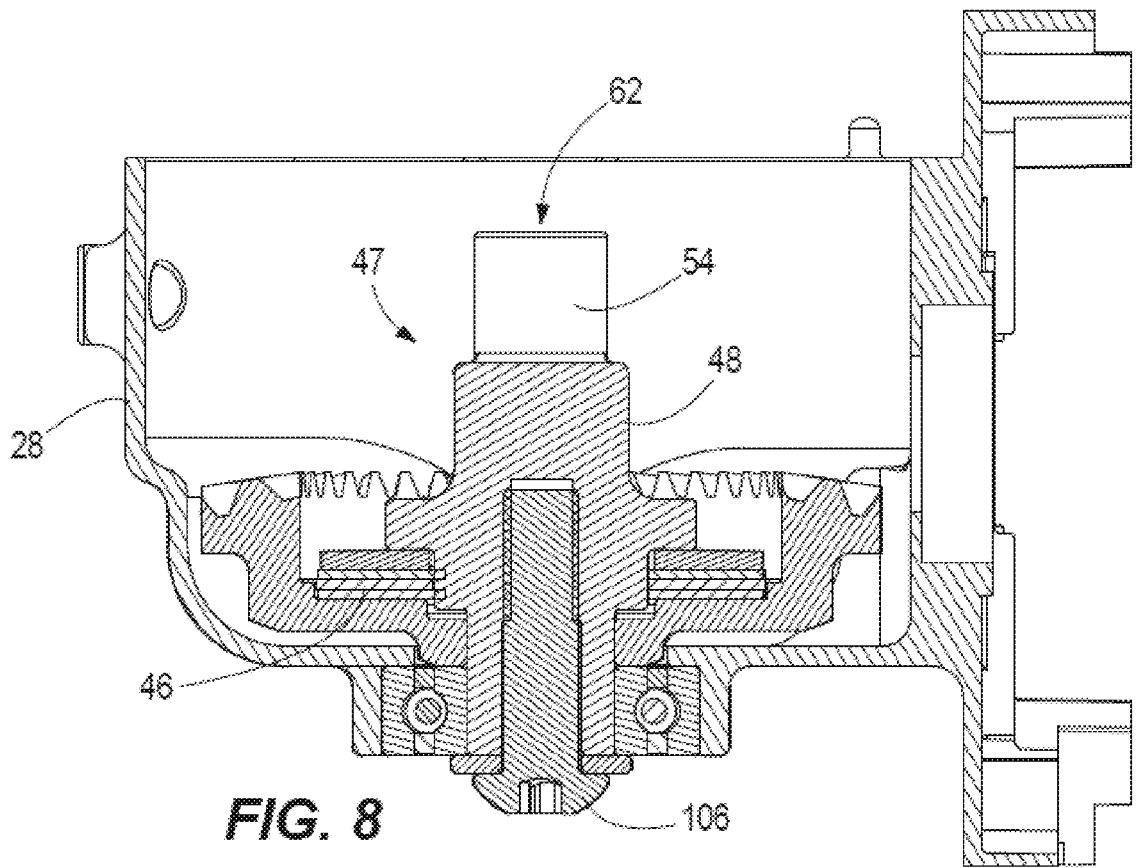
FIG. 8 is a cross-sectional view of a portion of the lower gear case subassembly of FIG. 7.
Figure 9:
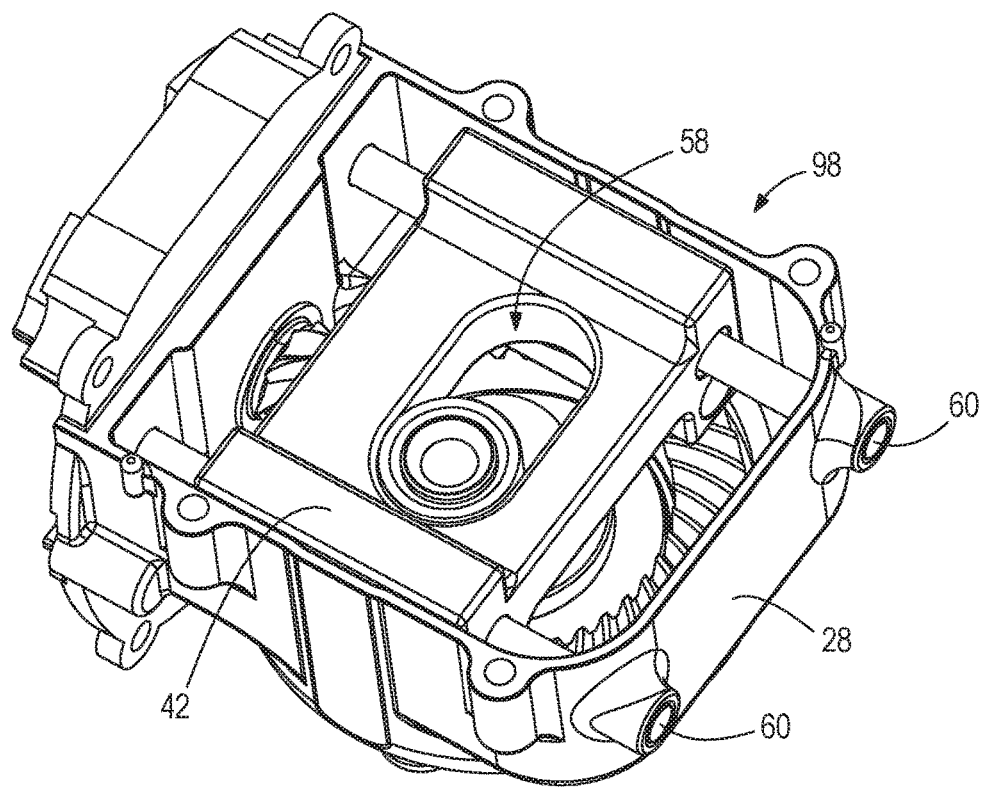
FIG. 9 is a perspective view of the lower gear case subassembly of FIG. 7.
Figure 10:
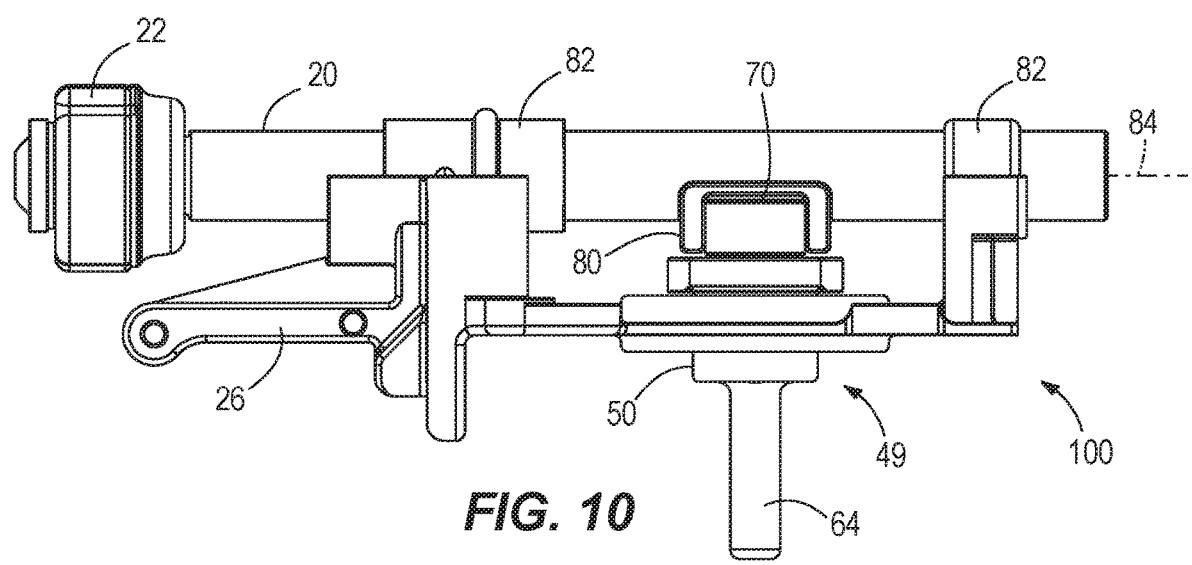
FIG. 10 is a plan view of the upper gear case subassembly of FIG. 7.

The reciprocating saw 10 further provides advantages including reduced assembly time and costs as compared to typical prior-art reciprocating saws. Specifically, while some of the components of the drive assembly 18 are assembled with the lower gear case 28 (i.e., a lower gear case subassembly 98 including the gear 38, the first driveshaft portion 47, the counterweight 42, etc., as shown in FIG. 9), further components of the drive assembly 18 may simultaneously be assembled with the upper gear case 26 (i.e., an upper gear case subassembly 100 including the driveshaft bearing 66, the second driveshaft portion 49, the spindle 20, etc., as shown in FIG. 10), thus reducing the total time required to assemble the reciprocating saw 10. Beginning with the lower gear case 28, to assemble the reciprocating saw 10, first the gear 38 is inserted into the lower gear case 28 (FIG. 8). The clutch assembly 46 is then lowered into the lower gear case 28 and seated against the gear 38. Next, the first driveshaft segment 48 is positioned against the clutch assembly 46, which is compressed flat between the gear 38 and the first driveshaft segment 48 by applying torque to a lower bolt 106 (FIG. 8) threaded from the outside into the first driveshaft segment 48. The counterweight bushing 56 is slipped onto the eccentric hub 54, and then the counterweight is then lowered into the lower gear case 28 with the counterweight bushing 56 passing into the elongated slot 58. The guide rails 60 are then pressed into the lower gear case 28, passing through the counterweight 42 to establish the slideable engagement therebetween (FIG. 9).

Turning now to the upper gear case 26, first the driveshaft bearing 66 is pressed into the upper gear case 26, and the second driveshaft segment 50 is then slid into the driveshaft bearing 66 (FIG. 7). The crankshaft 68 is then coupled to the second driveshaft segment 50 by aligning the locator pin 72 with the locator aperture 74 and pressing the crankshaft 68 into engagement with the second driveshaft segment 50 (FIG. 11). The screw 76 is applied and tightened to clamp the crankshaft 68 to the second driveshaft segment 50. The spindle bearing 70 is applied to the crankshaft 68, and then the spindle 20 is coupled to the upper gear case 26 with the channel 78 oriented to receive the spindle bearing 70. The spindle 20 is then secured to the upper gear case 26 by applying front and rear bushing covers 102, 104 (FIG. 4).

With the lower and upper gear case subassemblies 98, 100 sub-assembled, the assembly of the gear case 24 can be completed by attaching the upper gear case subassembly 100 to the lower gear case subassembly 98. As the upper and lower gear case subassemblies 100, 98 are attached to one another, the pin 64 of the second driveshaft segment 50 slip fits into the bore 62 of the first driveshaft segment 48. Beyond this nominal slip fit, no further mechanical connection between the two drive shaft segments 48, 50 is achieved. Thus, the first driveshaft portion 47 is coupled to the second driveshaft portion 49 by joining the upper and lower gear case subassemblies 100, 98. The motor housing 14 can then be secured to the assembled gear case 24, with the pinion 32 passing into the gear case 24 to engage the gear 38.

Figure 14:
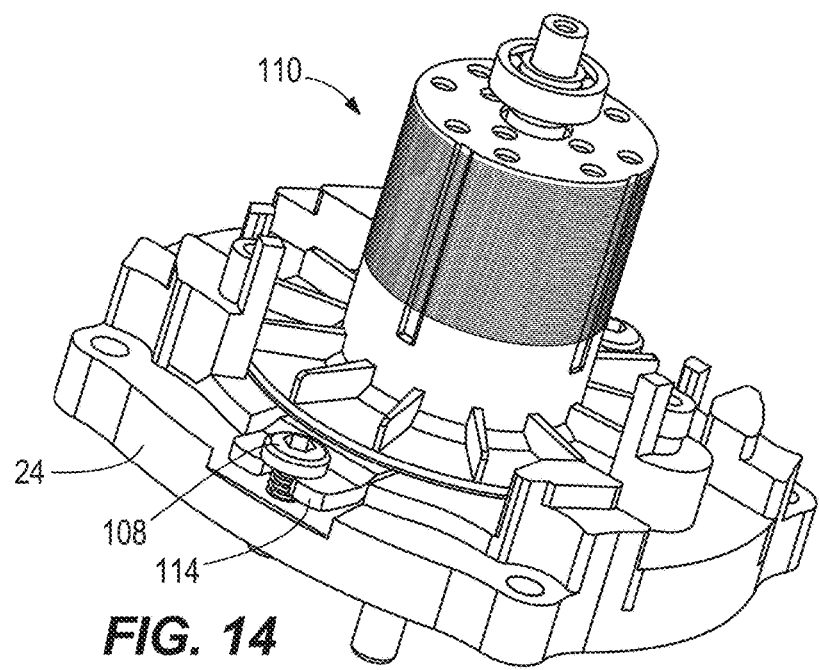
FIG. 14 is a perspective view of portions of a motor and the gear case of the reciprocating saw of FIG. 1.
Figure 15:
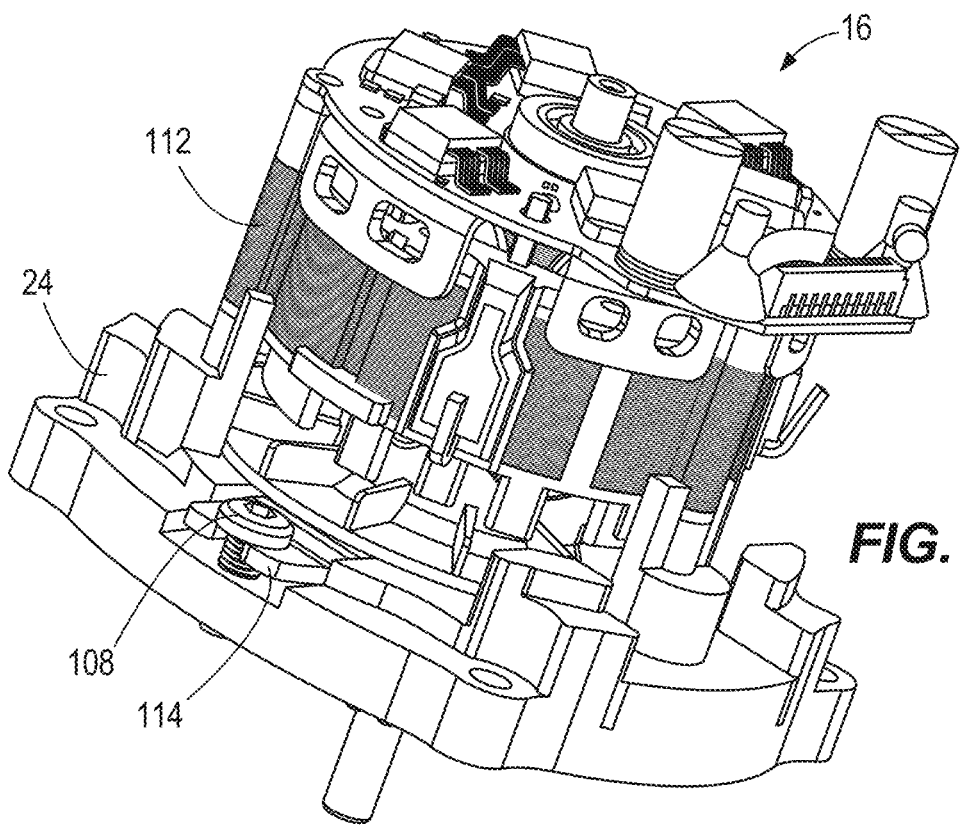
FIG. 15 is another perspective view of portions of a motor and the gear case of the reciprocating saw of FIG. 1.
Figure 16:
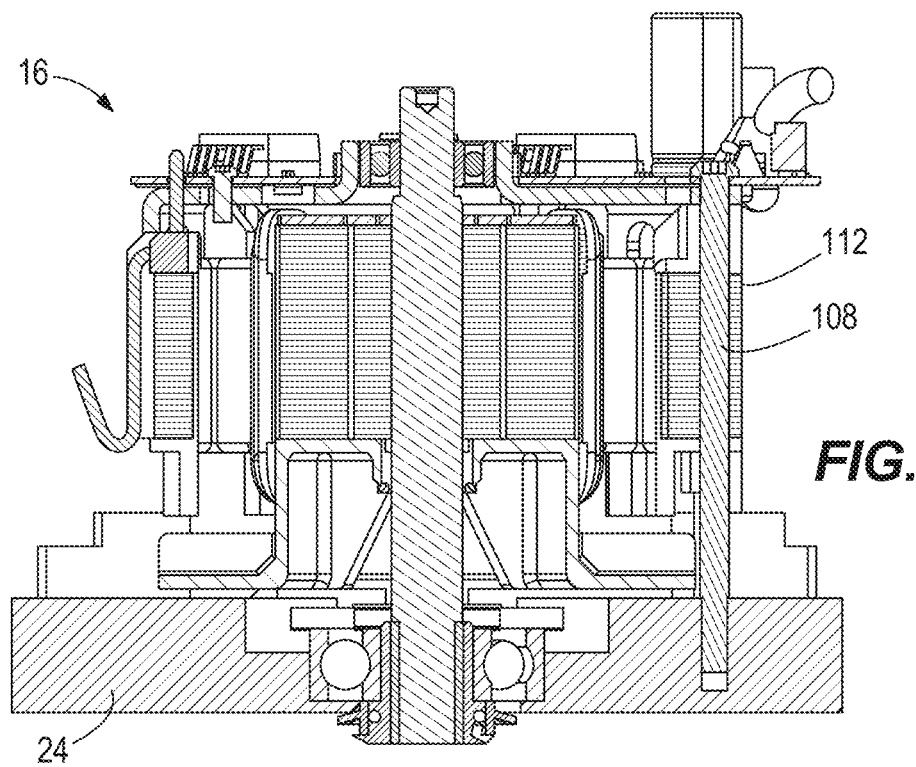
FIG. 16 is a cross-sectional view of portions of a motor and the gear case of the reciprocating saw of FIG. 1.

In some embodiments, such as that shown in FIGS. 14-16, the separate motor housing 14 (FIG. 2) is omitted, and instead the motor 16 is mounted to the gear case 24 via fasteners (e.g., screws 108). In such embodiments, the motor housing 14 is omitted from the reciprocating saw 10, and the handle housing 15 fully extends to the gear case 24 to encapsulate the motor 16. However, in such embodiments, the motor 16 is not supported by the handle housing 15 and instead is secured within the reciprocating saw 10 by the screws 108 engaging the gear case 24.

With continued reference to FIGS. 14-16, the motor 16 (FIG. 15) includes a rotor assembly 110 (FIG. 14) and a stator assembly 112 (FIG. 15) positioned about the rotor assembly 110. The rotor assembly 110 includes flanges 114 secured to the gear case 24 by the screws 108, thereby supporting the rotor assembly 110 at one end (FIG. 14). The stator assembly 112 is positioned about the rotor assembly 110, and additional screws 108 secure the stator assembly 112 to the gear case 24 (FIG. 16). When mounted to the gear case 24, the stator assembly 112 supports the rotor assembly 110 at the other end.

Various features of the invention are set forth in the following claims.

What is claimed is:

1. A reciprocating saw comprising:
   a motor defining a motor axis, the motor including a front end, a motor shaft extending from the front end, and a back end, the front end including a front face defining a first vertical plane perpendicular to the motor axis, and the back end including a rear face opposite the front face, the rear face defining a second vertical plane parallel to the first vertical plane and perpendicular to the motor axis;
   a pinion coupled to the motor shaft;
   a gear that receives torque from the pinion;
   a dual-eccentric scotch yoke mechanism coupled to the motor, the scotch yoke mechanism including
      a spindle driven to reciprocate relative to the motor along a spindle axis parallel to the motor axis, the spindle including a rear end nearest to the motor,
      a counterweight driven to reciprocate relative to the motor and opposite to the spindle,
      a driveshaft including a first driveshaft portion and a second driveshaft portion configured to co-rotate about a driveshaft axis, the driveshaft receiving torque from the gear, the first driveshaft portion driving the counterweight to reciprocate relative to the motor,
      a pin coupled to one of the first driveshaft portion or the second driveshaft portion,
      a bore defined in the other of the first driveshaft portion or the second driveshaft portion, wherein the pin is received within the bore to couple the first driveshaft portion to the second driveshaft portion with a slip fit, wherein the bore and the pin are offset from the driveshaft axis, and
      a crankshaft coupled to the driveshaft;
   wherein the spindle, with the reciprocating saw in a horizontal orientation, is arranged above the motor such that, as the spindle reciprocates forward and backward for each drive cycle, the rear end extends into a space defined between the first and second vertical planes during at least a portion of the drive cycle; and
   wherein the first driveshaft portion and the second driveshaft portion are configured to transmit torque from the motor to the crankshaft to impart the reciprocating movement to the spindle.

2. The reciprocating saw of claim 1, wherein the motor includes a fan that defines one of the front face and the rear face.

3. The reciprocating saw of claim 2, wherein the motor includes a circuit board that defines the other of the rear face and the front face.

4. The reciprocating saw of claim 1, further comprising a clutch assembly that selectively transmits torque from the gear to the driveshaft.

5. The reciprocating saw of claim 1, wherein the first driveshaft portion includes a first driveshaft segment, and the second driveshaft portion includes a second driveshaft segment and the crankshaft affixed to the second driveshaft segment.

6. The reciprocating saw of claim 5, wherein the first driveshaft segment includes an eccentric hub that defines the bore, and wherein the second driveshaft segment includes the pin.

7. The reciprocating saw of claim 1, further comprising a gear case and a guide rail supported within the gear case, wherein the counterweight is configured to slide along the guide rail as the counterweight is driven to reciprocate relative to the motor.

8. The reciprocating saw of claim 1, further comprising:
   a first gear case subassembly including the counterweight and the first driveshaft portion configured to drive the counterweight to reciprocate; and
   a second gear case subassembly including the spindle and the second driveshaft portion configured to drive the spindle to reciprocate;
   wherein the first driveshaft portion is coupled to the second driveshaft portion by joining the second and first gear case subassemblies.

9. The reciprocating saw of claim 1, wherein the pin is cylindrical without threads.

* * * * *